Patented Feb. 5, 1952

2,584,126

UNITED STATES PATENT OFFICE 2,584,126

COPOLYMERS OF DICHLORODIFLUORO-ETHYLENE AND ETHYLENE

William E. Hanford, Short Hills, N. J., assignor to E. I. du Pont de Nemours & Company, Wilmington, Del., a corporation of Delaware No Drawing. Application October 27, 1947, Serial No. 782,457

3 Claims. (Cl. 260—87.5)

This invention relates to polymeric materials and more particularly to polymers obtained from dichlorodifluoroethylenes.

This application is a continuation-in-part of abandoned application Serial No. 526,331, filed March 13, 1944.

This invention has as an object the production of new and useful compositions of matter. A further object is the preparation of valuable high molecular weight polymers. Other objects will be apparent from the following description of the invention.

These objects are accomplished by the following invention which comprises polymerizing the dichlorodifluoroethylene as more fully described hereinafter.

The new polymers of this invention, which comprise both homopolymers and copolymers, are obtained by reacting either of the above mentioned dichlorodifluoroethylenes, namely, 1,1-dichloro-2,2-difluoroethylene or 1,2-dichloro-1,2-difluoroethylene, in contact with a polymerization catalyst and under superatmospheric pressure.

The preferred embodiments of the invention are illustrated by the following examples in which the proportions of reactants are given in parts by weight.

Example I

A stainless steel, high pressure reactor is flushed with oxygen-free nitrogen and is then charged with 250 parts of oxygen-free water and 0.64 part of tertiary butylhydroperoxide. The reactor is closed, evacuated, cooled in a solid carbon dioxide/methanol mixture, and is then further charged with 40 parts of 1,1-dichloro - 2,2 - difluoroethylene. The reactor is agitated and heated to 148–152° C. for 10 hours during which a pressure of 870–940 atm. is maintained in the reactor by injecting water. The sum of the individual pressure drops during the periods between the water repressuring operations is about 160 atm. The reaction vessel is cooled to room temperature and the contents of the tube discharged. The solid polymer formed in the reaction is filtered, washed well with water, and air dried at 100° C. for 24 hours. The dried polymer amounts to 6.5 parts. A film can be prepared by pressing the polymer at 230° C. between steel plates covered with aluminum foil.

Example II

A stainless steel, high pressure reactor is charged, as described in Example I, with 200 parts of oxygen-free water, 0.16 parts of di- tertiary butylperoxide, and 35 parts of 1,1-dichloro - 2,2 - difluoroethylene. The reactor is agitated and heated to 170–180° C. for 8 hours during which a pressure of 750–1025 atm. is maintained in the reactor by injecting water. At the conclusion of the reaction the vessel is cooled to room temperature and the contents of the tube discharged. The solid polymer formed in the reaction is filtered, washed in water, and air dried at 120° C. for 25 hours. The dried polymer amounts to 4.0 parts. This polymer can be pressed into clear films in a Carver press. Anal. calcd. for $(C_2F_2Cl_2)_x$; F, 28.6. Found: F, 29.1.

Example III

A silver-lined high pressure reactor is flushed with oxygen-free hydrogen and then charged with 250 parts of deoxygenated water and 0.15 part of alpha, alpha' - azodicyclohexanecarbonitrile. The reactor is closed, evacuated, cooled in solid carbon dioxide/methanol mixture, and is then further charged with 40 parts of 1,2-dichloro-1,2-difluoroethylene. The reactor is agitated and heated to 97–100° C. for 18.5 hours, during which a pressure of 960–1000 atm. is maintained in the reactor by injecting water. The reaction vessel is then cooled to room temperature and the contents of the tube discharged. The solid polymer obtained from the reaction after washing and drying at 60° C. under 20 mm. vacuum for 24 hours amounts to 0.9 part of white, lumpy polymer which can be pressed between plates of a Carver press into a film at a pressing temperature of 130° C.

Example IV

A stainless steel high pressure reactor is flushed with oxygen-free nitrogen and then is charged with 25 parts of oxygen-free water and 0.05 part of benzoyl peroxide. The water occupies about ¼ of total internal volume of the reaction vessel. The reactor is closed, evacuated, cooled in a solid carbon dioxide/methanol mixture, and is then further charged with 10 parts of 1,1-dichloro-2,2-difluoroethylene. Ethylene is admitted to the reaction system from a high pressure storage system to provide a total pressure of about 50 atmospheres. The reactor is agitated and heated to 80° C. and the pressure in the reactor is then raised to 500 atm. by the injection of an additional amount of ethylene. The temperature is maintained at 80° C. and additional ethylene is introduced to raise the pressure to 700 atm. After 13 hours the pressure had dropped to 620 atm. The reaction vessel is cooled to room temperature, the unreacted portion of the gaseous monomers is bled off and the contents of the reaction tube are discharged. After drying, 5 parts of a 1,1-dichloro-2,2-difluoroethylene/ethylene copolymer is obtained. This copolymer contains 21.72% chlorine which corresponds to a 1,1-dichloro-2,2-difluoroethylene content of 40.7%, an ethylene content of 59.3%, and a 1,1-dichloro-2,2-difluoroethylene: ethylene mol ratio of 1:6.9. This copolymer can be pressed into continuous films which have tensile strengths as high as 1800 lbs./sq. in. and elongations of 600%.

Because of the extreme rapidity with which certain copolymerizations of the dichlorodifluoroethylenes proceed, particularly those containing predominant amounts of the chlorofluoroolefins of this invention, utmost caution should be exercised to avoid uncontrollable and explosive reactions, especially when operating under pressure in excess of 300 atm.

Example V

A silver-lined, high pressure reactor after flushing with oxygen-free nitrogen, is charged with 200 parts of oxygen-free water and 0.15 part of lauroyl peroxide. The reactor is closed and connected to a source of a gas mixture containing 95 per cent ethylene by weight and 5 per cent 1,1-dichloro-2,2-difluoroethylene by weight. The reactor is agitated and heated, and when the reactor reaches a temperature of 60° C., a sufficient quantity of the gas mixture is injected to raise the pressure to 500 atm. and heating is continued. The copolymerization is carried out by injecting the gas mixture into the reactor in the pressure range of 850–1000 atmospheres at a reaction temperature of 70–75° C. during a period of 10 hours. After cooling, the reactor is opened and 18 parts of white, lumpy copolymer are obtained. This copolymer can be pressed into clear, extremely tear-resistant and unusually limp films. For example, the Olsen stiffness, as determined by A. S. T. M. test "Stiffness in Flexure of Non-Rigid Plastics," D–744–43T, is 5500 lbs./sq. in., only about one-fourth that of the polymer obtained from ethylene alone. A film was too tough to tear in a test described in "Technical Assoc. of the Pulp and Paper Ind., Standard Method, T–414–m–40," whereas the ethylene polymer is much weaker in this respect. This copolymer contains 9.0% chlorine which corresponds to a 1,1-dichloro-2,2-difluoroethylene content of 16%, an ethylene content of 84%, and a mol ratio of 1,1-dichloro-2,2-difluoroethylene: ethylene of 1:23.5.

Example VI

In accordance with the foregoing procedure, treatment of a gas mixture containing, by weight, 96% ethylene and 4% 1,1-dichloro-2,2-difluoroethylene with alpha, alpha'-azobis(alpha,-gamma-dimethylvaleronitrile) catalyst instead of lauroyl peroxide at 54° C. for 17.8 hours under 800–1000 atm. gives 14.5 parts of a lumpy copolymer containing 4.43% chlorine. This analysis corresponds to a 1,1-dichloro-2,2-difluoroethylene:ethylene mol ratio of 1:52, or to 8.3% chlorofluoroolefin and 91.7% ethylene by weight. The copolymer can be pressed into tough films at 170° C. in a Carver press. These pressed films have zero tenacity temperatures of 150° C., compared to 115° C. for unmodified ethylene polymer. Films also are more tear-resistant than unmodified ethylene polymer.

Example VII

Desirable copolymers containing high proportions of 1,1-dichloro-2,2-difluoroethylene to ethylene can be obtained as e. g. in the following description.

A silver-lined, high pressure reactor is charged with 160 parts of methanol and 0.2 part of alpha, alpha'-azobisisobutyronitrile. The reactor is closed, cooled in a bath of carbon dioxide/methanol, evacuated, and then charged with 40 parts of 1,1-dichloro-2,2-difluoroethylene and 50 parts of ethylene. The reactor is connected to a source of water under pressure and heated to 63–67° C., and a pressure of 850–1000 atmospheres is maintained by water injection. After 9.5 hours, the reactor is cooled and the contents discharged. The reaction mixture consists of lumpy polymer suspended in the aqueous methanol. The polymer is removed by filtration and dried. It weighs 35 parts. The copolymer can be pressed into clear, tough films at 180° C. in a Carver press. Pressed films have a tensile strength of 7000 lbs./sq. in. at 210 per cent elongation, are exceptionally tear resistant, very transparent, and rigid. The copolymer contains 42.95 per cent chlorine which corresponds to a 1,1-dichloro-2,2-difluoroethylene content of 80.7%, an ethylene content of 19.3% by weight and a mol raio of 1,1-dichloro-2,2-difluoroethylene:ethylene of 1:1.15.

Example VIII

Using essentially the same procedure as described in Example IV except that 10 parts of 1,2-dichloro-1,2-difluoroethylene is used instead of its isomer, 1,1-dichloro-2,2-difluoroethylene, a copolymer is obtained which contains 13.1% fluorine which corresponds to a 1,2-dichloro-1,2-difluoroethylene content of 45.8% and an ethylene content of 54.2% by weight, or to a 1,2-dichloro-1,2-difluoroethylene:ethylene mol ratio of 1:56. Films prepared by hot-pressing the polymer between steel plates covered with aluminum foil are capable of being permanently elongated as much as 600%.

Example IX

A silver-lined, high pressure reactor is charged as described in the Example V with the following: 150 parts of oxygen-free water, 0.15 part of lauroyl peroxide, 5 parts of 1,2-dichloro-1,2-difluoroethylene and 95 parts of ethylene. The reaction is carried out at 70° C. for a period of 18.6 hours under a pressure of 850–1000 atm. which is maintained by injection of water. From this reaction there is obtained 31 parts of a copolymer which contains 3.0% chlorine. This chlorine content corresponds to a 1,2-dichloro-1,2-difluoroethylene content of 5.8% by weight and an ethylene content of 94.2% by weight. Pressed films of the copolymer have a tensile strength of 2217 lb./sq. in. at 368% elongation, an Olsen stiffness value of 45,093 lb./sq. in. and a film 6.7 mils thickness has the high tear value of 960. A film had a zero tenacity temperature value of about 137° C.

Example X

A silver-lined high pressure reactor is charged as described in the preceding example with 225 parts of deoxygenated water and 0.15 part of alpha, alpha'-azobisisobutyronitrile. The reactor is closed and evacuated. A liquid monomer mixture containing 59% by weight of 1,2-dichloro-1,2-difluoroethylene and 41% by weight of ethylene is then injected into the reactor at a temperature of 50° C. for a period of 15.6 hours, sufficient monomer mixture being continuously injected to maintain a pressure of 450–500 atm. At the termination of the run the reactor is cooled, the unreacted monomer is bled off and the tube opened. Large, lumpy, white particles of polymer suspended in water are obtained as the product of the reaction. The polymer is filtered, washed with distilled water and dried at 100° C. during five hours under a vacuum of 5 mm. The dry polymer weighs 40.5 parts. The chlorine content of the polymer, 38.5%, corresponds to a composition containing 71% by weight of the 1,2-difluoro-1,2-dichloroethylene and 29% by weight of ethylene. The polymer is pressed into clear, tough films at 170° C. in a Carver press. Films have a tensile strength of 5000 lb./sq. in. at 196% elongation, and an Olsen stiffness value of 192,500 lb./sq. in. A pressed film 10 mils thick lost virtually all its tensile strength at 157° C. (i. e. the zero tenacity temperature is 157° C.) and a film 5 mils thick did not tear in a tear test described in the TAPPI test T-414m-40. A compression molded bar of the polymer had a Rockwell hardness value of 72, determined as described in ASTM–D785–44T— "Rockwell Hardness of Plastics and Electrical Insulating Materials." Films and bars are brilliantly clear, high softening and self-extinguishing in contrast to those from ethylene polymer, which are opaque, low-softening and flammable.

*Example XI*

Into a stainless steel high pressure reactor from which the air had been displaced with oxygen-free nitrogen is charged 0.6 part of ammonium persulfate, 1.2 parts of borax, and 120 parts of deoxygenated water. The reactor is closed, evacuated and cooled in a Dry Ice-acetone bath. Into this cold reactor is introduced, successively, 50 parts of 1,1-dichloro-2,2-difluoroethylene and 100 parts of vinyl chloride. The mixture is then heated to 50° C. and maintained at this temperature under autogenous pressure, with agitation, for 12 hours. After cooling the reactor, the pressure is slowly released and the non-volatile products are removed. The partly coagulated dispersion of polymer is stirred rapidly while aqueous saturated sodium sulfate is being added to complete the coagulation. The coagulum is filtered, washed with successive portions of distilled water until the wash water gives a negative test for sulfate ion, and dried in a vacuum desiccator. The white, powdery product, obtained in a yield of 36 parts, contains 4.4% fluorine, which corresponds to a 1,1-dichloro-2,2-difluoroethylene:vinyl chloride mole ratio of 1:11.7, and to a ratio by weight of 15.3:84.7.

*Example XII*

Using a silver-lined high pressure reactor as described in previous examples, copolymerization of vinyl chloride (50 parts) with 1,2-dichloro-1,2-difluoroethylene (10 parts) in the presence of 225 parts of oxygen-free water, 0.15 part of alpha, alpha'-azobis(alpha, gamma-dimethyl-gamma-methoxyvaleronitrile), and 1 part of sodium pyrophosphate for 11 hours at 30° C. under 900 atm. pressure maintained by water injection gives 43 parts of a copolymer containing 3.2% fluorine. This corresponds to 11.2% by weight of the chlorofluoroolefin and 88.8% by weight of vinyl chloride. This copolymer has a relative viscosity of 1.07 (0.1% in cyclohexanone at 25° C.) Pressed films of the copolymer have a tensile strength of 7887 lb./sq. in. at 85% elongation, Olsen stiffness value of about 277,000 lb./sq. in., and a molded bar has an Izod impact value of 0.7 foot-pounds per inch of notch. Films have a zero tenacity temperature of 109° C. This polymer is more thermally stable and has a higher softening point than polymeric vinyl chloride.

*Example XIII*

Vinyl fluoride (30 parts) is copolymerized with 1,1-dichloro-2,2-difluoroethylene (60 parts) in accordance with the general procedure of Example III in the presence of 200 parts of oxygen-free water and 0.15 part of lauroyl peroxide at 68–71° C. for 11 hours under a pressure of 875–1000 atm. maintained by injection of water. The solid polymer formed is filtered, washed thoroughly with water, and dried at 60° C. in a vacuum of 20 mm. for 24 hours. The dried polymer amounts to 12 parts. A clear attractive-looking film was cast from a hot dimethyl formamide solution of the copolymer. This film has a tensile strength of 4725 lb./sq. in. and a zero tenacity temperature of 132° C. The polymer contains 39.4% chlorine which corresponds to a 1,1-dichloro-2,2-difluoroethylene content of 73.7%, a vinyl fluoride content of 26.3%, and to a 1,1-dichloro-2,2-difluoroethylene:vinyl fluoride mol ratio of 1:1.03.

*Example XIV*

Isobutylene (20 parts) and 1,1-dichloro-2,2-difluoroethylene (45 parts) copolymerized as in the previous example in the presence of 0.15 part of benzoyl peroxide and 200 parts of deoxygenated water for 10 hours at 80–90° C. under 200–250 atmospheres give 18 parts of a white, lumpy polymer which, by chlorine analysis, has a 1,1-dichloro-2,2-difluoroethylene:isobutylene mol ratio of 1:1.1, and a ratio by weight of 68.3:31.7.

*Example XV*

(a) A mixture of 150 parts of oxygen-free water, 0.18 part of ammonium persulfate, 0.05 part of sodium bisulfite, 2.0 parts of higher fatty alcohol sulfate, 1.5 parts of sodium pyrophosphate, and 20 parts of vinyl acetate is charged into a silver-lined high pressure reactor previously swept with oxygen-free nitrogen. The reactor is closed, evacuated, and cooled in carbon dioxide/methanol mixture, and is then further charged with 40 parts of 1,2-dichloro-1,2-difluoroethylene. The reactor is agitated and heated to 80° C. for a period of 15.5 hours during which a pressure of 900–950 atm. is maintained in the reactor by the injection of water. The reaction vessel is then cooled to room temperature, the unreacted portion of the gaseous monomer is bled off and the contents of the reaction tube are discharged. The emulsion is coagulated by addition of methanol, the coagulum washed with water and dried. After drying, 37 parts of a 1,2-dichloro-1,2-difluoroethylene:vinyl acetate copolymer is obtained. This copolymer contains 27.94% of chlorine which corresponds to a fluoroolefin content of 52.3% and a vinyl acetate content of 47.7%, and to a mol ratio of 1,2-dichloro-1,2-difluoroethylene:vinyl acetate of 1:1.4. The copolymer has a relative viscosity of 0.77 (0.1% in cyclohexanone at 25° C.). Films prepared by hot pressing the polymer between steel plates covered with aluminum foil have a tensile strength of 8707 lb./sq. in., an Olsen stiffness value determined according to ASTM–D747–43T—"Stiffness in Flexure of Non-Rigid Plastics," of about 495,000 lb./sq. in., and the molded bars of the copolymer have an Izod impact strength value determined according to ASTM-D256-43T-"Impact Resistance of Plastics and Electrical Insulating Materials" of 0.5 foot-pounds per inch of notch. The copolymer has higher thermal stability, higher stiffness, and higher softening point than polymeric vinyl acetate.

(b) A copolymer (15 parts) containing 70% vinyl acetate and 30% 1,2-dichloro-1,2-difluoroethylene is obtained by heating 7 parts of the chlorofluoroolefin, 10 parts of freshly distilled vinyl acetate, and 0.2 part benzoyl peroxide in a glass reactor at 65° C. for 16 hours under autogenous pressure. The chlorine content of this copolymer, 16%, corresponds to a 1,2-dichloro-1,2-difluoroethylene:vinyl acetate mol ratio of 1:3.6.

(c) By essentially the same procedure a mixture of 5 parts of 1,1-dichloro-2,2-difluoroethylene, 5 parts of freshly distilled vinyl acetate and 0.1 part of benzoyl peroxide give 10 parts of copolymer containing 26.15% chlorine, which corresponds to a 1,1-dichloro-2,2-difluoroethylene content of 49.1%, a vinyl acetate content of 50.9% and to a 1,1-dichloro-2,2-difluoroethylene:vinyl acetate mol ratio of 1:1.6.

*Example XVI*

(a) A mixture of 0.1 part of benzoyl peroxide, 5 parts of 1,1-dichloro-2,2-difluoroethylene, and 5 parts of acrylonitrile is charged into a glass reaction vessel which has previously been swept with oxygen-free nitrogen. The reactor is then evacuated and closed. After heating at 65° C. for 16 hours while agitating, there is obtained 5 parts of a copolymer of 1,1-dichloro-2,2-difluoroethylene and acrylonitrile which contains 3.03% chlorine, corresponding to a copolymer containing 5.7% 1,1-dichloro-2,2-difluoroethylene and 94.3% acrylonitrile and to a mol ratio of 1,1-dichloro-2,2-difluoroethylene:acrylonitrile of 1:42.

(b) A mixture of 0.2 part of benzoyl peroxide, 8 parts of 1,2-dichloro-1,2-difluoroethylene, and 10 parts of acrylonitrile is polymerized using the same general procedure as described above. There is obtained 10.5 parts of a copolymer of 1,2-dichloro-1,2-difluoroethylene and acrylonitrile which contains 1.64% chlorine, which corresponds to a 1,2-dichloro-1,2-difluoroethylene content of 3.0% and an acrylonitrile content of 97%, and to a mol ratio of 1,2-dichloro-1,2-difluoroethylene:acrylonitrile of 1:79.

*Example XVII*

(a) Into a glass reaction vessel previously swept with oxygen-free nitrogen is charged 0.1 part of benzoyl peroxide, 5.7 parts of 1,1-dichloro-2,2-difluoroethylene and 5 parts of styrene. The nitrogen is removed by evacuation and the reaction vessel is closed. After heating at 65° C. for 16 hours with agitation, there is obtained 7 parts of a copolymer of 1,1-dichloro-2,2-difluoroethylene and styrene which melts and spins into continuous filaments at 90° C. The copolymer contains 17.72% chlorine which corresponds to a 1,1-dichloro-2,2-difluoroethylene content of 33.3% and a styrene content of 66.7% and to a 1,1-dichloro-2,2-difluoroethylene:styrene mol ratio of 1:2.57.

(b) A mixture of 7 parts of 1,2-dichloro-1,2-difluoroethylene, 10 parts of styrene and 0.2 part of benzoyl peroxide is copolymerized under the procedure described in the previous section (a) whereby there is obtained 10.6 parts of a copolymer of 1,2-dichloro-1,2-difluoroethylene and styrene which softens and becomes tacky at 105° C. and which melts at 145° C. The copolymer contains 6.22% chlorine which corresponds to a mol ratio of 1,2-dichloro-1,2-difluoroethylene:styrene of 1:9.7 and to a weight ratio of 11.6:88.4.

*Example XVIII*

(a) A mixture of 0.1 part of benzoyl peroxide, 5 parts of 1,1-dichloro-2,2-difluoroethylene, and 5 parts of methyl methacrylate is charged into a glass reaction vessel and copolymerization is carried out essentially as described in the previous example, i. e., at 65° C. for 16 hours under autogenous pressure with agitation. There is obtained 6 parts of a tough copolymer of 1,1-dichloro-2,2-difluoroethylene and methyl methacrylate which becomes soft and tacky at 145° C. This copolymer contains 4.13% chlorine which corresponds to a 1,1-dichloro-2,2-difluoroethylene content of 7.8% and a methyl methacrylate content of 92.2% and to a mol ratio of 1,1-dichloro-2,2-difluoroethylene : methyl methacrylate of 1:16.

(b) A mixture of 0.2 part of benzoyl peroxide, 10 parts of 1,2-dichloro-1,2-difluoroethylene, and 10 parts of methyl methacrylate is charged into a glass reaction vessel and copolymerization is carried out essentially as described in the above example. There is obtained 12.5 parts of a copolymer which softens at 150° C. and becomes tacky at 160° C. This copolymer contains 3.03% chlorine which corresponds to a 1,2-dichloro-1,2-difluoroethylene content of 5.7% and a methyl methacrylate content of 94.3% and to a mol ratio of 1,2-dichloro-1,2-difluoroethylene:methyl methacrylate of 1:22.

The products of this invention, which can contain 5 to 100% of the dichlorodifluoroethylenes, are macromolecular polymers in which the degree of polymerization is greater than three, i. e., more than three molecules of the monomers are present in the polymer.

In the preparation of the dichlorodifluoroethylene copolymers of this invention by polymerizing a mixture of monomeric dichlorodifluoroethylene with at least one other polymerizable compound, the proportions of the latter employed, based on the total weight of monomeric ingredients, can be from about 5% to 95%. The dichlorodifluoroethylene content of the polymers of the invention can vary from 5 to 100% by weight, and although copolymers containing smaller proportions of the chlorofluoroolefin may be obtained, 5% is, practically speaking, about the smallest amount which will effect significant modification of properties in comparison with the homopolymers of the comonomers. The most useful polymers are those containing at least 10% by weight of the dichlorodifluoroethylene since these, in general, possess superior mechanical workability and clarity. From the standpoint of flame resistance polymers in which the major component is dichlorodifluoroethylene are preferred.

The compounds which can be copolymerized with the dichlorodifluoroethylenes in the practice of this invention are unsaturated organic compounds which contain terminal ethylenic unsaturation and which can, per se, be polymerized to high-molecular-weight compounds. i. e., products having a degree of polymerization greater than three. Examples of such unsaturated compounds comprise the vinylidene compounds which include both the vinyl and vinylidene compounds such as vinyl esters, e. g., vinyl acetate, vinyl propionate, vinyl stearate, vinyl trimethylacetate, vinyl and vinylidene halides of which vinyl chloride, vinyl fluoride, vinylidene chloride and vinylidene fluoride are the most useful. Further examples of the vinylidene and other polymerizable compounds containing terminal ethylenic unsaturation are the acrylic and methacrylic acids and their derivatives such as the esters of lower aliphatic alcohols, e. g., methyl, ethyl, etc., the anhydrides, amides, and nitriles; olefinic hydrocarbons, e. g., monoolefinic hydrocarbons such as ethylene, styrene, propylene, isobutylene; dienes such as butadiene, chloroprene, fluoroprene, isoprene; tetrafluoroethylene and trifluorochloroethylene. Of these polymerizable unsaturated organic compounds containing terminal ethylenic unsaturation, those vinylidene compounds in which the terminal ethylenic carbon atom is attached solely to hydrogen are preferred because they copolymerize most readily with the dichlorodifluoroethylenes of this invention.

The properties of the dichlorodifluoroethylene copolymers of this invention vary considerably with the comonomer employed, ranging from limp, flexible, translucent materials to extremely tough, rigid, transparent solids. In general, they differ from the homopolymers of both of the dichlorodifluoroethylenes and of the other comonomers in exhibiting abnormally high stiffness, impact strength, tear resistance in thin film form, and tensile strength. These copolymers also differ from the homopolymers of the comonomers with respect to increased zero tenacity temperature, flame resistance, moisture sensitivity, and, in many cases, improved transparency. These last named properties are, of course, exhibited to the highest degree in the homopolymers of the dichlorodifluoroethylenes.

Dichlorodifluoroethylene/ethylene copolymers are outstanding in many respects in comparison with ethylene polymer. Those copolymers containing from about 10% to about 40% dichlorodifluoroethylene by weight are considerably less stiff than ethylene polymer, a property which is desired in many unsupported film uses. In general, these copolymers also have higher tensile strength than ethylene polymer and, in thin sections, markedly improved tear resistance. Their durability on outdoor exposure is also significantly better than that of ethylene polymer. Dichlorodifluoroethylene/ethylene copolymers containing about 40% dichlorodifluoroethylene by weight, on the other hand, tend to soften higher than ethylene polymer and to be stiffer than it, the stiffness increasing with the dichlorodifluoroethylene content. In contrast to ethylene polymer, these copolymers are transparent and are self-extinguishing.

Copolymers of the dichlorodifluoroethylenes with other polymerizable monoolefinic hydrocarbons, such as styrene, and isobutylene, differ from the homopolymers of these hydrocarbons in similar respects. Among outstanding differences are noted improved softening point, impact strength, and stiffness.

Copolymers of the dichlorodifluoroethylenes with vinylidene halides, such as vinyl chloride, vinyl fluoride, vinylidene chloride and vinylidene fluoride are noted for their improved thermal stability and mechanical workability in comparison with the homopolymers of these vinylidene halides. In general, these copolymers tend to be more flexible and less brittle than the vinylidene halide homopolymers. These properties make the copolymers adaptable to coating and finishes applications in which the unplasticized vinylidene halide homopolymers cannot be employed.

Copolymers of the dichlorodifluoroethylenes with vinyl esters, such as vinyl acetate and vinyl trimethylacetate, are outstanding in comparison with the homopolymers of these vinyl esters in being much higher softening and much less sensitive to moisture. For example, polyvinyl acetate is so low softening as to be virtually useless in plastics applications, whereas its copolymers with dichlorodifluoroethylenes soften well above room temperature. Moreover, polyvinyl acetate, often employed as an adhesive, has the serious disadvantage of losing much of its strength on exposure to water, whereas copolymers of vinyl acetate with the dichlorodifluoroethylenes lose virtually none of their tensile strength after soaking 24 hours in water.

Copolymers of the dichlorodifluoroethylenes with completely halogenated fluoroolefins, such as tetrafluoroethylene, have the important advantages over polytetrafluoroethylene itself in being more readily moldable and in being extrudable. Thus, these copolymers have essentially the same superb chemical and heat stability as polytetrafluoroethylene combined with markedly improved mechanical workability.

The catalyst should be employed in an amount in excess of 0.001% (based on the total weight of monomers). In general, less than 5.0% of catalyst will be used, the preferred amount being between 0.1 and 1.0%.

The polymerization can be effected in bulk; in solution, e. g., in tertiary butanol, methanol, or benzene; or in emulsion by application of heat, light, oxygen, or polymerization catalysts. For emulsion polymerization there can be employed surface-active agents, e. g., the C-higher alkyl betaines such as C-cetyl betaine, the quaternary ammonium halides such as cetyltrimethylammonium chloride, and the alkali metal and amine salts of higher alkanol sulfates such as the sodium or diethylcyclohexylammonium dodecyl sulfates. The polymerization can be effected as a batch, semi-continuous, or continuous process.

A wide variety of polymerization catalysts can be employed in the practice of this invention. Among the most useful are the peroxygen and azo compounds. By peroxygen compounds is meant a compound containing the peroxygen linkage, —O—O—, and by azo compounds is meant a compound containing the azo linkage, —N=N—. Suitable peroxy catalysts comprise diacyl peroxides, e. g., benzoyl peroxide and lauroyl peroxide; diethyl peroxide, tertiary butyl hydroperoxide and hydrogen peroxide, barium peroxide, magnesium peroxide, ammonium persulfate, sodium persulfate, potassium persulfate, and the like. Examples of azo compounds, aside from those illustrated in the examples, useful in the practice of the invention include alpha,-alpha'-azobis (alphamethylbutyronitrile), dimethyl and diethyl alpha,alpha'-azodiisobutyrate, 1,1'-azodicyclohexanecarbonitrile, alpha,-alpha'-azodiisobutyrocarbonamide, alpha,alpha'-azobis(alpha-phenylpropionitrile), etc. In general, the synthesis of homopolymers of the dichlorodifluoroethylenes described herein can be effected with the same catalyst, but higher pressures or longer reaction periods are usually required for homopolymerization than for the copolymerization.

The polymerization temperatures which are generally applicable are within the range of about 20–200° C., preferably 40–120° C., depending upon the type of catalyst used. With diacyl peroxide catalysts, temperatures ranging from 60–120° C.; with persulfate or azo catalysts, 20–100° C.; and with dialkyl peroxides, 100–150° C. are generally used. The pressures used will range from 1 to 1000 atm. or more, the maximum pressure being limited only by the apparatus available.

The products of this invention are adapted to a variety of uses. They may be used in molding plastics, films, foils, fibers, and adhesives. They are especially useful, particularly the ethylene/-dichlorodifluoroethylene copolymers, as safety glass interlayers. Fibers and films of the polymers of this invention can be used as insulating materials by wrapping the article to be insulated. These wrappings can be set by heat treatment to eliminate the tendency of the insulation to unwrap. This heat setting treatment, particularly of oriented fibers and films, results in an increase in their flexible life, i. e., the resistance to heat embrittlement. Solutions of the polymers can be used for coating wires, coils, fiber glass, bentonite films, porous carbon articles, ceramics and mica. Dispersions of the polymers can readily be prepared, for example, from solutions of the polymers. For many of these purposes, the polymers may be combined with or prepared in the presence of plasticizers, stabilizers, fillers, pigments, dyes, softeners, natural resins, or other synthetic resins.

As many widely different embodiments of this invention may be made without departing from the scope and spirit thereof, it is to be understood that this invention is not limited to the specific embodiment thereof except as defined in the appended claims.

I claim:
1. A macromolecular copolymer of a dichlorodifluoroethylene and ethylene which copolymer consists of, by weight, about 5% to 81% of said dichlorodifluoroethylene.

2. A macromolecular copolymer of a dichlorodifluoroethylene and ethylene which copolymer consists of, by weight, about 10% to 81% of said dichlorodifluoroethylene.

3. A macromolecular copolymer of a dichlorodifluoroethylene and ethylene which copolymer consists of, by weight, about 10% to 40% of said dichlorodifluoroethylene.

WILLIAM E. HANFORD.

REFERENCES CITED

The following references are of record in the file of this patent:

UNITED STATES PATENTS

| Number | Name | Date |
|---|---|---|
| 2,388,178 | Peterson | Oct. 30, 1945 |
| 2,393,967 | Brubaker | Feb. 5, 1946 |
| 2,407,419 | Hanford | Sept. 10, 1946 |
| 2,419,009 | Coffman | Apr. 15, 1947 |

FOREIGN PATENTS

| Number | Country | Date |
|---|---|---|
| 110,457 | Australia | May 9, 1940 |
| 796,026 | France | Mar. 27, 1936 |

OTHER REFERENCES

Locke et al., J. Am. Chem. Soc., vol. 56, pp. 1726–1728, 1934.

McBee et al., Abstract of Papers 112—The Meeting of the American Chem. Soc. 1947, page 14J.

McBee et al., Ind. & Eng. Chem. vol 41, No. 1, 1949 pages 70–72.